UNITED STATES PATENT OFFICE.

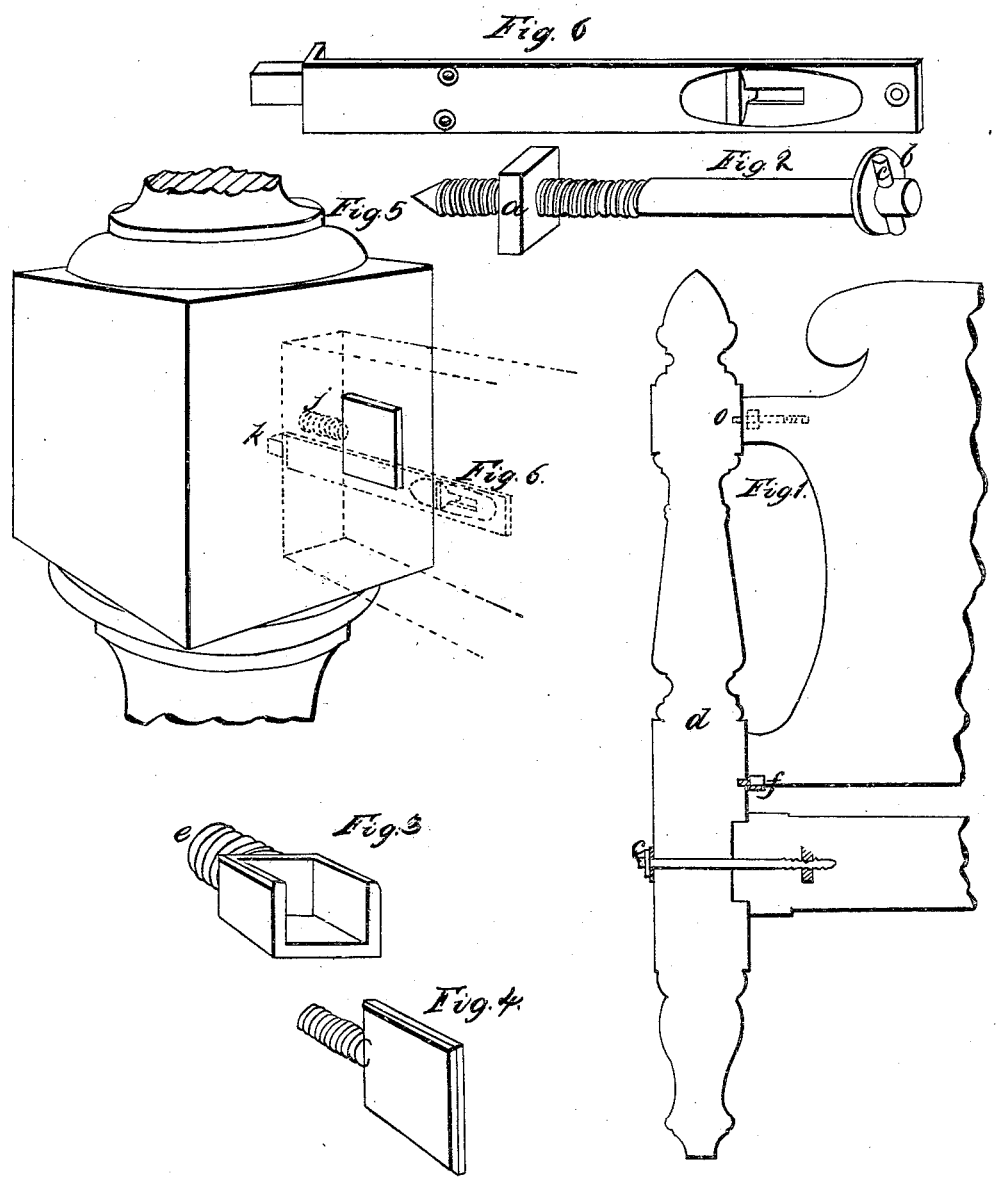

JAMES KNIPE, OF NEW YORK, N. Y.

FASTENING BEDSTEADS.

Specification of Letters Patent No. 2,415, dated January 8, 1842.

*To all whom it may concern:*

Be it known that I, JAMES KNIPE, of the city, county, and State of New York, have invented a new and useful Improvement in the Mode of Constructing Fastenings for Bedsteads; and I do hereby declare that the following is a full, clear, and exact description of the construction and operation of the same, reference being had to the annexed drawings, making a part of this specification, in which—

Figure 1 is a sectional view of a post and rail with the head board attached.

The manner in which I construct the screws to secure the rails to the posts is as follows, (see No. 2 of the drawing). The screw is constructed with a nut $a$, similar to the common bed screw, the peculiarity consisting in the construction of the head by placing a washer on the screw as shown at $b$, and then passing a small pin through the bolt, or screw as shown at $c$. The advantage of this arrangement is that, the screw is not taken out of the rail when the bedstead is taken apart, the pin $c$ Fig. 1, being knocked out the post $d$ is readily drawn off leaving the screw in the rail.

The arrangement and construction of the head-board fastenings is as follows: No. 3 is a perspective view of a metallic socket which receives the lower edge of the head board the socket being constructed with a screw as shown at $e$; it is secured to the bed post by being screwed to it, by said screw $e$, as shown at $f$ on Fig. 1. The upper rail of the head board is kept in its place by having a small metallic plate about three-fourths of an inch square, and $\frac{3}{16}$ thick which is cast with a screw attached to it as shown at No. 4. This plate is screwed to the post in a vertical position as shown at $o$, on Fig. 1, and at $j$, on No. 5. A common flush bolt shown at No. 6 is set into the upper rail of the head-board. When the head board stands in its place the lower edge rests in the socket $f$, the upper rail resting against the plate $j$. The bolt No. 6, is pushed forward and rests in a mortise made in the post as shown at $k$ on No. 5.

What I claim as my invention and desire to secure by Letters Patent is—

1. The method of securing the post and rails of bedsteads by means of the screw and nut in combination with the washer and pin, in the manner described.

2. I also claim the mode of securing the head board by means of the socket No. 3 in combination with the plate No. 4 and flush bolts No. 5 substantially as herein described.

JAMES KNIPE.

Witnesses:
 WM. THORPE,
 WM. ROBERTSON.